United States Patent
Sung et al.

(10) Patent No.: US 6,961,103 B2
(45) Date of Patent: Nov. 1, 2005

(54) LIQUID CRYSTAL DISPLAY MODULE

(75) Inventors: Kuang-Tao Sung, Fongyuan (TW); Shih-Hsien Chen, Shengang (TW)

(73) Assignee: AU Optronics Corp., Hsinchu (TW)

( * ) Notice: Subject to any disclaimer, the term of this patent is extended or adjusted under 35 U.S.C. 154(b) by 38 days.

(21) Appl. No.: 10/780,931

(22) Filed: Feb. 17, 2004

(65) Prior Publication Data

US 2005/0068472 A1 Mar. 31, 2005

(30) Foreign Application Priority Data

Sep. 26, 2003 (TW) .......................... 92126599 A

(51) Int. Cl.⁷ ...................... G02F 1/1333; G02F 1/1335
(52) U.S. Cl. ........................................... 349/58; 349/64
(58) Field of Search ............................. 349/58, 64, 65

(56) References Cited

U.S. PATENT DOCUMENTS 6,411,353 B1 * 6/2002 Yarita et al. .................. 349/59
6,593,979 B1 * 7/2003 Ha et al. ...................... 349/58

* cited by examiner

Primary Examiner—James A. Dudek
(74) Attorney, Agent, or Firm—Thomas, Kayden, Horstemeyer & Risley

(57) ABSTRACT

A liquid crystal display module. The liquid crystal display module includes a frame, a light guide plate, a diffuser, at least one prism, an LCD panel, a first power and signal circuit board, a second power and signal circuit board, a light emitting element and a reflector. The frame has a receiving portion and groove adjacent thereto. The light guide plate is disposed in the receiving portion. The diffuser is disposed on the light guide plate. The prism is disposed on the diffuser. The LCD panel is disposed on the prism. The first power and signal circuit board is connected to the LCD panel and has a first optical layer covering the groove. The second power and signal circuit board is disposed in the groove. The light emitting element is disposed on the second power and signal circuit board and in the groove. The reflector is disposed under the frame.

17 Claims, 5 Drawing Sheets

FIG. 1 (RALATED ART)

FIG. 2 ( RALATED ART )

LIQUID CRYSTAL DISPLAY MODULE

BACKGROUND OF THE INVENTION

1. Field of the Invention

The present invention relates to a liquid crystal display module, and in particular to a liquid crystal display module that enhances light utilization.

2. Description of the Related Art

A hand-held electronic device, such as a cellular phone, is usually small and light. A light source, such as a light emitting diode (LED) or tube, for the liquid crystal display module of the hand-held electronic device is generally supported by a thin power and signal circuit board.

Referring to FIG. 1, a conventional liquid crystal display module 1 is sequentially composed of an LCD panel 11, two prisms 12 and 13, a diffuser 14, a light guide plate 15, a frame 16 and a reflector 17. A groove 18 is formed on one side of the frame 16. A first power and signal circuit board 19, with three light emitting diodes 20 disposed thereon, is disposed in the groove 18. A second power and signal circuit board 21 is connected to one side of the LCD panel 11. When the liquid crystal display module 1 is assembled, the second power and signal circuit board 21 covers the first power and signal circuit board 19 and three light emitting diodes 20 disposed thereon. Light from the light emitting diodes 20 is input to the light guide plate 15 and then reflected into the LCD panel 11 by the reflector 17.

Since none of the light emitting diodes 20 is a spot light source, emitting uni-directional light, the light from the light emitting diodes 20 penetrates the second power and signal circuit board 21 or causes irregular bright areas on the LCD panel 11. Hence, light provided by the light emitting diodes 20 is not fully utilized, thereby reducing the performance of the liquid crystal display module 1.

Referring to FIG. 2, another liquid crystal display module 2 is disclosed to overcome the drawbacks of the liquid crystal display module 1. One surface of a black shading tape 22 is attached to the three light emitting diodes 20 disposed on the first power and signal circuit board 19, and the other surface is attached to the second power and signal circuit board 21. Thus, light from the light emitting diodes 20 does not penetrate the second power and signal circuit board 21.

The black shading tape 22, however, cannot effectively promote utilization of light from the light emitting diodes 20. In other words, the black shading tape 22 increases the total thickness of the liquid crystal display module 2 (or reduces the strength of the frame 16 if the construction of the groove 18 is modified). Since the thickness of the liquid crystal display module 2 is increased, use thereof is thereby limited. Additionally, extra processes and assistant tools are needed to attach the black shading tape 22 to the light emitting diodes 20 and second power and signal circuit board 21 during manufacture of the liquid crystal display module 2, thus increasing manufacturing time and cost and reducing productivity. Moreover, after attachment of the black shading tape 22 is complete, uneven areas thereon must be flattened by a roller or heating and pressurizing method, again increasing the manufacturing time of the liquid crystal display module 2 and reducing the lifespan thereof. Further, if the black shading tape 22 is obliquely or incorrectly attached to the light emitting diodes 20 and second power and signal circuit board 21, the black shading tape 22 must be removed and replaced. Due to this, residual glue on the light emitting diodes 20 and second power and signal circuit board 21 must be removed, thus increasing the manufacturing time of the liquid crystal display module 2.

Hence, there is a need to provide an improved liquid crystal display module to overcome the aforementioned problems. Namely, the present liquid crystal display module can effectively enhance light utilization without increasing the total thickness thereof.

SUMMARY OF THE INVENTION

Accordingly, an object of the invention is to provide a liquid crystal display module to overcome the aforementioned problems. The liquid crystal display module comprises a frame, a light guide plate, a diffuser, at least one prism, an LCD panel, a first power and signal circuit board, a second power and signal circuit board, a light emitting element and a reflector. The frame has a receiving portion and a groove adjacent thereto. The light guide plate is disposed in the receiving portion. The diffuser is disposed on the light guide plate. The prism is disposed on the diffuser. The LCD panel is disposed on the prism. The first power and signal circuit board is connected to the LCD panel and has a first optical layer covering the groove. The second power and signal circuit board is disposed in the groove. The light emitting element is disposed on the second power and signal circuit board and in the groove. The reflector is disposed under the frame.

The liquid crystal display module further comprises a second optical layer formed on the second power and signal circuit board.

The first and second optical layers are composed of a reflective or light-absorptive material.

The light emitting element is a light emitting diode (LED).

The first and second power and signal circuit boards are flexible circuit boards.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
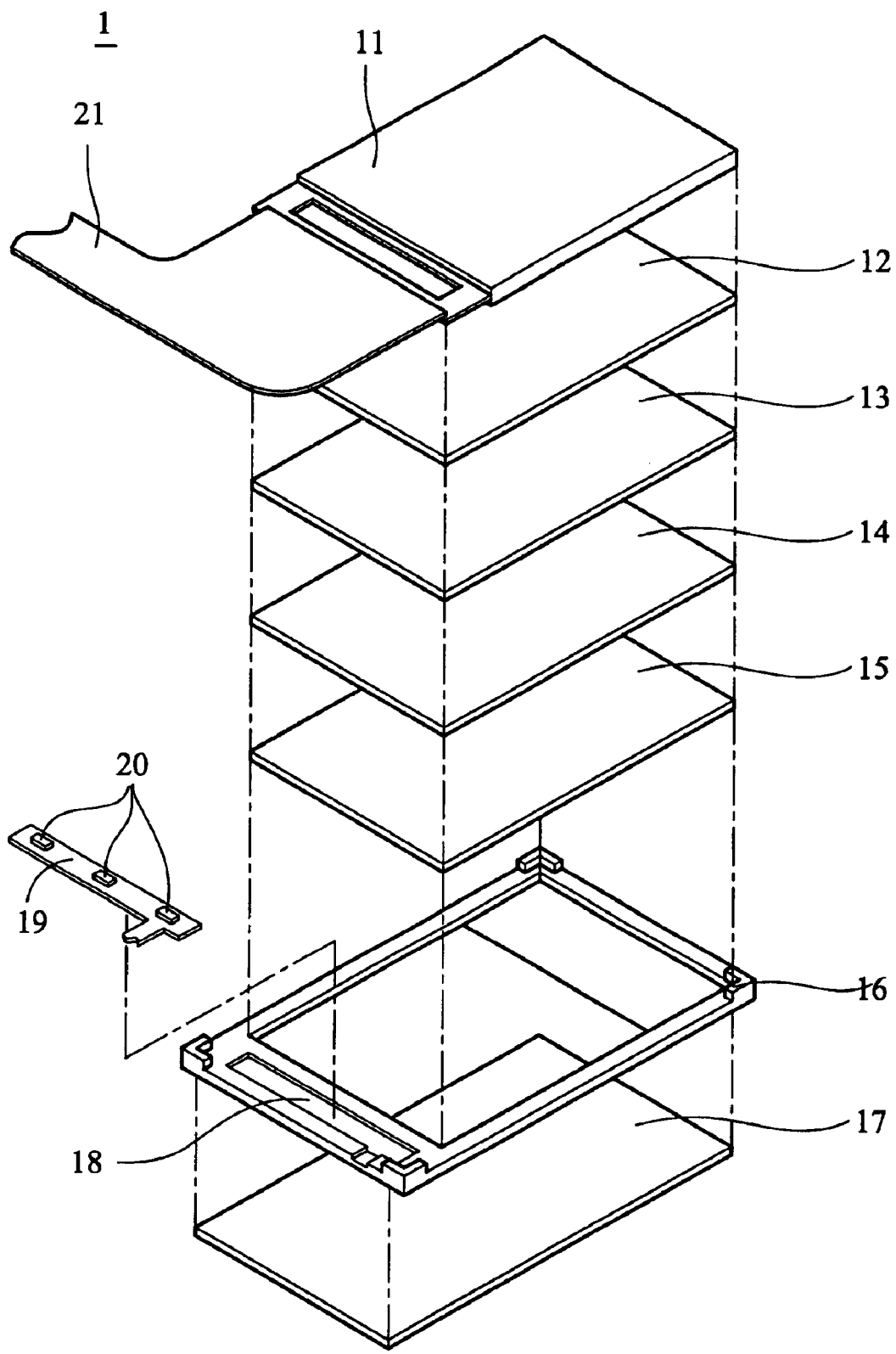
FIG. 1 is a schematic exploded perspective view showing a conventional liquid crystal display module.
Figure 2:
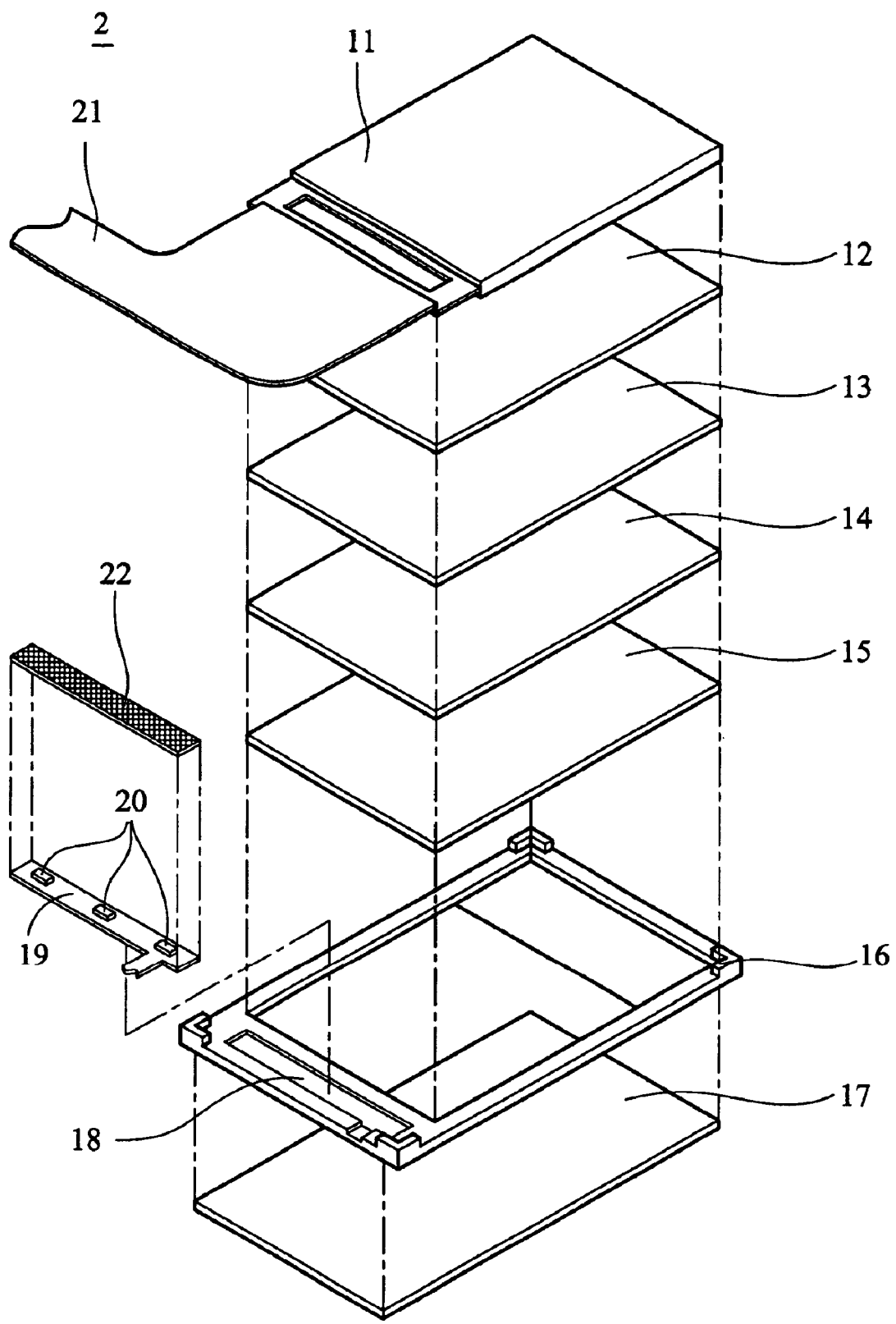
FIG. 2 is a schematic exploded perspective view showing another conventional liquid crystal display module.
Figure 3:
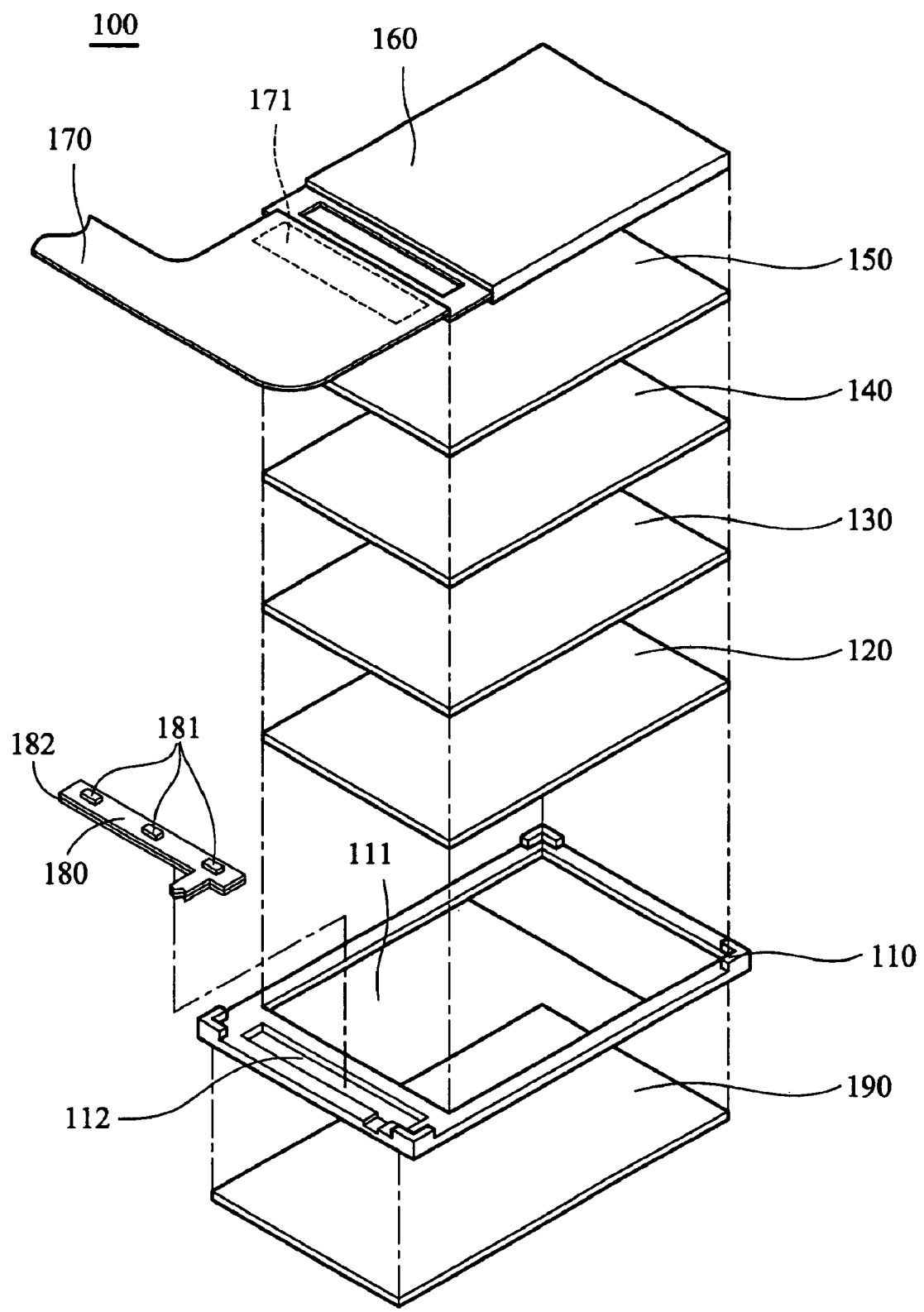
FIG. 3 is a schematic exploded perspective view showing the liquid crystal display module of the first embodiment of the invention.

Referring to FIG. 3, the liquid crystal display module 100 of this embodiment comprises a frame 110, a light guide plate 120, a diffuser 130, a first prism 140, a second prism 150, an LCD panel 160, a first power and signal circuit board 170, a second power and signal circuit board 180, three light emitting elements 181 and a reflector 190.

As shown in FIG. 3, the frame 110 has a receiving portion 111 and a groove 112 adjacent thereto. The light guide plate 120 is disposed in the receiving portion 111. The diffuser 130 is disposed on the light guide plate 120. The first prism 140 is disposed on the diffuser 130 and the second prism 150 is disposed thereon. The LCD panel 160 is disposed on the second prism 150. The reflector 190 is disposed under the frame 110. The first power and signal circuit board 170 is connected to the LCD panel 160 and the second power and signal circuit board 180 is disposed in the groove 112 of the frame 110 and extends out of the frame 110.

Additionally, a first optical layer 171 is formed on the first power and signal circuit board 170. When the liquid crystal display module 100 is assembled, the first optical layer 171 covers the groove 112 of the frame 110. The light emitting elements 181 are disposed on the second power and signal circuit board 180 and in the groove 112. Specifically, a second optical layer 182 is formed on the bottom of the second power and signal circuit board 180.

The first optical layer 171 and second optical layer 182 are printed on the first power and signal circuit is board 170 and the bottom of the second power and signal circuit board 180, respectively. The first optical layer 171 and second optical layer 182 may be composed of a reflective material (such as white paint) or light-absorptive material (such as black paint). In addition, the light emitting elements 181 may be light emitting diodes (LEDs) or tubes.

In this embodiment, the light emitting elements 181 are light emitting diodes, and the first power and signal circuit board 170 and second power and signal circuit board 180 are flexible circuit boards transmitting power and signals. Additionally, the first optical layer 171 and second optical layer 182 are composed of a reflective material.

After the liquid crystal display module 100 is assembled, the light emitting elements 181 are in the groove 112 of the frame 110 and the first optical layer 171 (reflective material) of the first power and signal circuit board 170 covers the groove 112. Accordingly, light from the light emitting elements 181 is input to the light guide plate 120 directly and by reflection of the first optical layer 171 and second optical layer 182. Thus, the light from the light emitting elements 181 does not penetrate the first power and signal circuit board 170 and second power and signal circuit board 180, and irregular bright areas are not created on the LCD panel 160. Namely, the light from the light emitting elements 181 can be fully utilized by the liquid crystal display module 100.

Specifically, the first optical layer 171 and second optical layer 182 are not limited to a reflective material. Namely, the first optical layer 171 and second optical layer 182 may be composed of a light-absorptive material when the light from the light emitting elements 181 is intense. Thus, part of the light is absorbed by the first optical layer 171 and second optical layer 182 and the optical performance of the liquid crystal display module 100 is not adversely affected.

Second Embodiment

Figure 4:
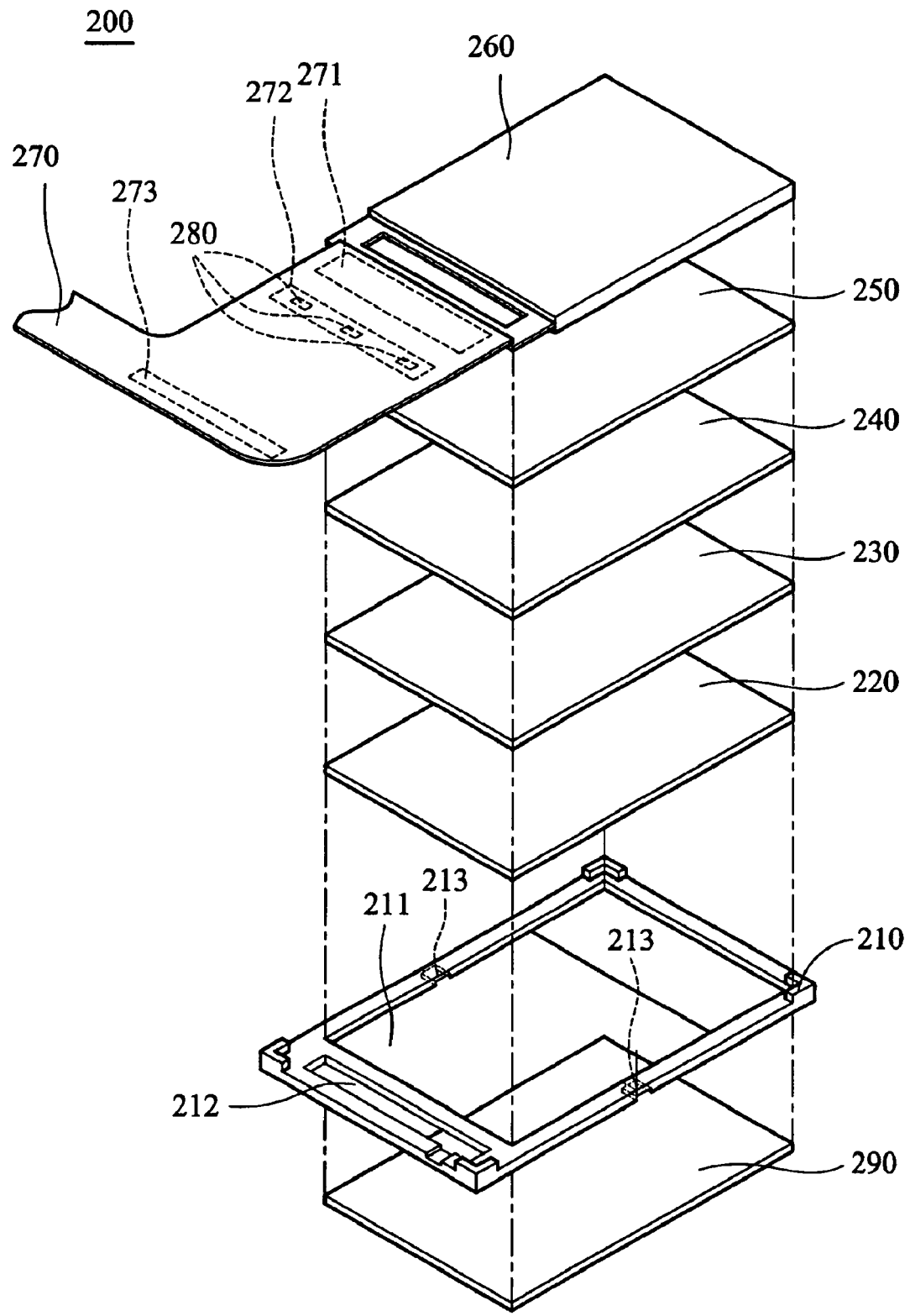
FIG. 4 is a schematic exploded perspective view showing the liquid crystal display module of the second embodiment of the invention.

Referring to FIG. 4, the liquid crystal display module 200 of this embodiment comprises a frame 210, a light guide plate 220, a diffuser 230, a first prism 240, a second prism 250, an LCD panel 260, a power and signal circuit board 270, three light emitting elements 280 and a reflector 290.

As shown in FIG. 4, the frame 210 has a receiving portion 211 and a through groove 212 adjacent thereto. The light guide plate 220 is disposed in the receiving portion 211. The diffuser 230 is disposed on the light guide plate 220. The first prism 240 is disposed on the diffuser 230 and the second prism 250 is disposed thereon. The LCD panel 260 is disposed on the second prism 250. The reflector 290 is disposed under the receiving portion 211 of the frame 210. The power and signal circuit board 270 is connected to the LCD panel 260. Specifically, when the liquid crystal display module 200 is assembled, the power and signal circuit board 270 is bent downward and extends to the lower surface of the frame 210 from the upper surface thereof.

Figure 5:
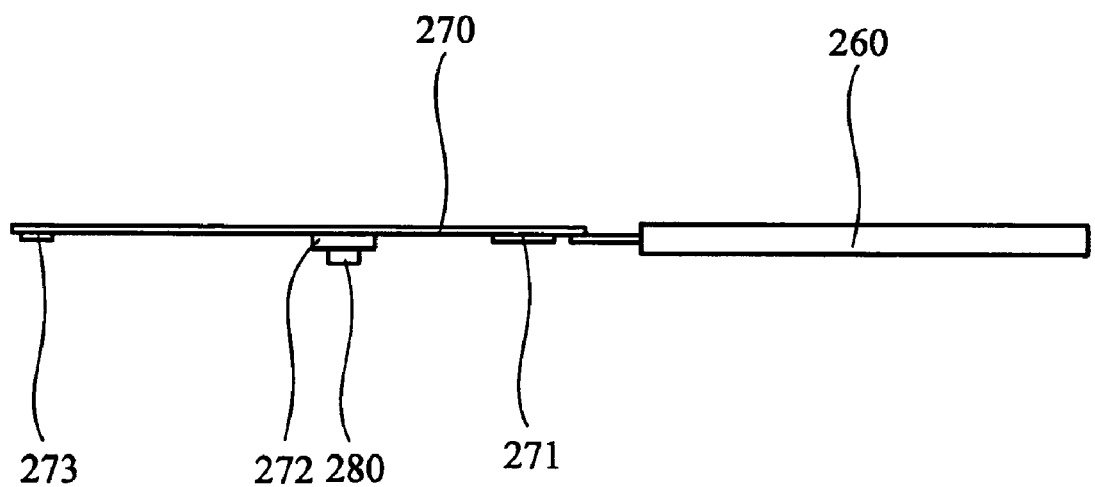
FIG. 5 is a schematic side view showing the power and signal circuit board according to FIG. 4.

As shown in FIG. 4 and FIG. 5, an optical layer 271 and shading layer 272 are formed on the power and signal circuit board 270. When the liquid crystal display module 200 is assembled, the power and signal circuit board 270 surrounds the through groove 212 of the frame 210 and the optical layer 271 is opposite to the shading layer 272. Namely, the optical layer 271 is located on the through groove 212 and the shading layer 272 is located therein by bending the power and signal circuit board 270.

The light emitting elements 280 are disposed on the shading layer 272 and electrically connected to the power and signal circuit board 270. Thus, the light emitting elements 280 are in the through groove 212 of the frame 210. Additionally, a tape 273 is adhered to the power and signal circuit board 270 and two recesses 213 are respectively formed on opposite edges of the bottom of the frame 210. When the power and signal circuit board 270 is bent downward and extends to the lower surface of the frame 210 from the upper surface thereof, the tape 273 adheres to the recesses 213 of the frame 210. Thus, the thickness of the liquid crystal display module 200 can be reduced after the assembly thereof is completed.

Moreover, the optical layer 271 is printed on the power and signal circuit board 270. The optical layer 271 may be composed of a reflective material (such as white paint) or light-absorptive material (such as black paint). In addition, the light emitting elements 280 may be light emitting diodes (LEDs) or tubes.

In this embodiment, the light emitting elements 280 are light emitting diodes, and the power and signal circuit board 270 is a flexible circuit board transmitting power and signals. Additionally, the optical layer 271 is composed of a reflective material and the shading layer 272 is a black tape.

After the liquid crystal display module 200 is assembled, the light emitting elements 280 and shading layer 272 are located in the through groove 212 of the frame 210 and the optical layer 271 (reflective material) covers the through groove 212. Accordingly, light from the light emitting elements 280 is input to the light guide plate 220 directly and by reflection of the optical layer 271. In another aspect, the light from the light emitting elements 280 is absorbed or shielded by the shading layer 272 in the through groove 212. Thus, the light from the light emitting elements 280 does not penetrate the power and signal circuit board 270, and irregular bright areas are not created on the LCD panel 260. Namely, the light from the light emitting elements 280 can be fully utilized by the liquid crystal display module 200.

The most important feature of the liquid crystal display module 200 is that the light emitting elements 280 and shading layer 272 are simultaneously located in the through groove 212 of the frame 210. Thus, the shading layer 272 can operate normally and does not increase the total thickness of the liquid crystal display module 200.

Specifically, the optical layer 271 is not limited to a reflective material. Namely, the optical layer 271 may be composed of a light-absorptive material when the light from the light emitting elements 280 is intense. Thus, part of the light is absorbed by the optical layer 271 and the optical performance of the liquid crystal display module 200 is not adversely affected.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display module, comprising:
   a frame having a receiving portion and a groove adjacent thereto;
   a light guide plate disposed in the receiving portion;
   a diffuser disposed on the light guide plate;
   at least one prism disposed on the diffuser;
   an LCD panel disposed on the prism;
   a first power and signal circuit board connected to the LCD panel and having a first optical layer covering the groove of the frame;
   a second power and signal circuit board disposed in the groove of the frame;
   a light emitting element disposed on the second power and signal circuit board and in the groove of the frame; and
   a reflector disposed under the frame.

2. The liquid crystal display module as claimed in claim 1, further comprising a second optical layer formed on the second power and signal circuit board.

3. The liquid crystal display module as claimed in claim 1, wherein the first optical layer is composed of a reflective material.

4. The liquid crystal display module as claimed in claim 1, wherein the first optical layer is composed of a light-absorptive material.

5. The liquid crystal display module as claimed in claim 2, wherein the second optical layer is composed of a reflective material.

6. The liquid crystal display module as claimed in claim 2, wherein the second optical layer is composed of a light-absorptive material.

7. The liquid crystal display module as claimed in claim 1, wherein the light emitting element is a light emitting diode (LED).

8. The liquid crystal display module as claimed in claim 1, wherein the first power and signal circuit board is a flexible circuit board.

9. The liquid crystal display module as claimed in claim 1, wherein the second power and signal circuit board is a flexible circuit board.

10. A liquid crystal display module, comprising:
    a frame having a receiving portion and a through groove adjacent thereto;
    a light guide plate disposed in the receiving portion;
    a diffuser disposed on the light guide plate;
    at least one prism disposed on the diffuser;
    an LCD panel disposed on the prism;
    a power and signal circuit board connected to the LCD panel and having an optical layer and a shading layer, the power and signal circuit board surrounding the through groove of the frame and extending to the lower surface of the frame from the upper surface thereof, the optical layer opposite to the shading layer and covering the through groove, and the shading layer disposed in the through groove;
    a light emitting element disposed on the shading layer and electrically connected to the power and signal circuit board, the light emitting element and shading layer disposed in the through groove of the frame; and
    a reflector disposed under the receiving portion of the frame.

11. The liquid crystal display module as claimed in claim 10, wherein the optical layer is composed of a reflective material.

12. The liquid crystal display module as claimed in claim 10, wherein the optical layer is composed of a light-absorptive material.

13. The liquid crystal display module as claimed in claim 10, wherein the shading layer is composed of a reflective material.

14. The liquid crystal display module as claimed in claim 10, wherein the shading layer is composed of a light-absorptive material.

15. The liquid crystal display module as claimed in claim 10, wherein the light emitting element is a light emitting diode (LED).

16. The liquid crystal display module as claimed in claim 10, wherein the power and signal circuit board is a flexible circuit board.

17. The liquid crystal display module as claimed in claim 10, wherein the bottom of the frame further comprises a recess and the power and signal circuit board further comprises a tape adhered thereto.

* * * * *